(12) United States Patent
Marius Goleret et al.

(10) Patent No.: US 9,791,656 B2
(45) Date of Patent: Oct. 17, 2017

(54) APPARATUS AND METHOD FOR INSERTING OPTICAL FIBERS INTO TUBES

(71) Applicant: CCS Technology, Inc., Wilmington (DE)

(72) Inventors: Vincent Yves Marius Goleret, Berlin (DE); Mustafa Keskin, Berlin (DE); Wolf Peter Kluwe, Hagen (DE); Jürgen Matthies, Wetter (DE); Gordon Mueller-Schlomka, Berlin (DE); Martin Schulte, Wildau (DE); Michael Wimmer, Berlin (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 15/459,400

(22) Filed: Mar. 15, 2017

(65) Prior Publication Data

US 2017/0184806 A1     Jun. 29, 2017

Related U.S. Application Data

(63) Continuation of application No. PCT/US2015/051357, filed on Sep. 22, 2015.

(30) Foreign Application Priority Data

Sep. 26, 2014  (EP) .................................... 14186598

(51) Int. Cl.
G02B 6/44          (2006.01)
(52) U.S. Cl.
CPC .......... *G02B 6/4471* (2013.01); *G02B 6/4446* (2013.01)

(58) Field of Classification Search
CPC .. G02B 6/4471; G02B 6/4446; G02B 6/4439; G02B 6/448
See application file for complete search history.

(56) References Cited

U.S. PATENT DOCUMENTS

| | | | |
|---|---|---|---|
| 4,989,945 | A | 2/1991 | Ohkura |
| 5,625,737 | A | 4/1997 | Saito |

(Continued)

FOREIGN PATENT DOCUMENTS

| | | |
|---|---|---|
| JP | 2004354895 A | 12/2004 |
| JP | 5344625 B2 | 11/2013 |
| WO | 2014122246 A2 | 8/2014 |

OTHER PUBLICATIONS

European Search Report/Office Action for Application No. 14186598.0-1553 dated Mar. 19, 2015, 6 pages.

(Continued)

*Primary Examiner* — John M Bedtelyon
(74) *Attorney, Agent, or Firm* — Adam R. Weeks (57) ABSTRACT

Apparatus for inserting optical fibers into furcation tubes comprises a plurality duct-like channels each configured to receive one of the furcation tubes in such a way that the furcation tube is insertable from a first side of the apparatus into the duct-like channel so that a long tube section of the furcation tube can be left protruding on the first side and a short tube section of the furcation tube can protrude on an opposite second side of the apparatus. Each duct-like channel is further configured so that a portion of the long tube section becomes spread apart along a longitudinal slot of the furcation tube, thereby allowing an optical fiber to be inserted into the short tube section and extended through the furcation tube before protruding from the longitudinal slot in the long tube section.

17 Claims, 8 Drawing Sheets

(56) References Cited

U.S. PATENT DOCUMENTS

| | | | |
|---|---|---|---|
| 6,389,214 B1 * | 5/2002 | Smith | G02B 6/3878 |
| | | | 385/136 |
| 6,623,173 B1 | 9/2003 | Grois et al. | |
| 6,751,834 B2 * | 6/2004 | Gordon | G02B 6/4463 |
| | | | 156/259 |
| 7,270,485 B1 | 9/2007 | Robinson et al. | |
| 8,938,143 B2 | 1/2015 | Do et al. | |
| 9,535,230 B2 * | 1/2017 | Newbury | G02B 6/4471 |
| 2002/0141724 A1 | 10/2002 | Ogawa et al. | |
| 2004/0197066 A1 | 10/2004 | Daoud | |
| 2008/0138026 A1 | 6/2008 | Yow et al. | |
| 2013/0183012 A1 | 7/2013 | Cabanne Lopez et al. | |
| 2013/0330052 A1 | 12/2013 | Thackston et al. | |
| 2014/0010508 A1 | 1/2014 | Matsuo et al. | |
| 2014/0037255 A1 | 2/2014 | Mullaney et al. | |

OTHER PUBLICATIONS

Patent Cooperation Treaty, International Search Report and Written Opinion for PCT/US2015/051357, dated Dec. 7, 2015, 3 pages.

* cited by examiner

APPARATUS AND METHOD FOR INSERTING OPTICAL FIBERS INTO TUBES

PRIORITY APPLICATIONS

This application is a continuation of International Application No. PCT/US2015/051357 filed on Sep. 22, 2015, which claims the benefit of priority of European Patent Application Serial No. 14186598.0, filed on Sep. 26, 2014, the content of both applications being relied upon and incorporated herein by reference in its entirety.

FIELD

The present disclosure relates to an apparatus for inserting optical fibers into tubes. The present disclosure relates further to an assembly comprising such an apparatus and to a method for inserting optical fibers into tubes using such an apparatus.

BACKGROUND

When designing data transmission networks comprising optical fibers, it is necessary to handle optical fibers, especially to connect optical fibers to one another. Junctions between optical fibers can be provided by patch connections and splice connections. In addition it is often necessary to fan-out individual optical fibers from a fiber bundle or fiber cable. When providing such a fiber fan-out, optical fibers of the fiber bundle or fiber cable need to be inserted into individual furcation tubes. The furcation tubes protect the fibers between the fiber bundle or fiber cable and a connector. The furcation tubes usually have an outer diameter of 900 μm, an inner diameter of 400 μm and a length of 25 inches (63.5 cm), 36 inches (91.4 cm) or 47 inches (119.4 cm). The tolerances for the furcation tubes are ±75 μm for the inner and the outer diameter. The optical fibers which need to be inserted into the furcation tubes usually have an outer diameter of 200 μm or 250 μm.

The installation manual "Indoor Applications Kit—6- or 12-Fiber Buffer Tube Fan-out (BTF) Kit, standard recommended procedure 000-084, issue 17, Aug. 2010, Corning Cable Systems LLC" discloses a prior art fan-out kit and a prior art method for inserting optical fibers into furcation tubes. Although the current procedure is effective, there remains room for improvement.

For example, it can be a challenge to bring the fan-out kit body to the right position without kinking the optical fibers. When optical fibers of a gel-filled fiber bundle or gel-filled fiber cable need to be handled, no gel residue on the optical fibers is allowed. A gel residue would block the insertion into the furcation tubes, because the optical fibers would stick at the inner side of the furcation tube and there would be no possibility to pull the optical fiber further. The furcation tube would then be contaminated and a new fan-out kit would have to be used. The cleaning of the optical fibers from the gel can be time consuming and takes the risk to damage the optical fibers.

SUMMARY

The present disclosure proves apparatuses and methods for inserting optical fibers into tubes.

According to one embodiment, a method for inserting at least one optical fiber into at least one furcation tube uses an apparatus that includes at least one duct-like channel into which the at least one furcation tube is inserted. A long tube section of the at least one furcation tube protrudes on a first side of the apparatus, and a short tube section of the at least one furcation tube protrudes on an opposite second side of the apparatus. The method comprises inserting an optical fiber into the short tube section of the at least one furcation tube and extending the optical fiber through the at least one furcation tube in such a way that an end section of the optical fiber protrudes from a slot in the long tube section. The slot extends longitudinally along the furcation tube to a free end of the long tube section. The apparatus is moved relative to the at least one furcation tube along the longitudinal direction of the at least one furcation tube, over the long tube section, and toward the free end of the long tube section to move the end section of the optical fiber through the slot in the long tube section so that the optical fiber becomes inserted into the furcation tube.

According to one embodiment, an apparatus for inserting optical fibers into furcation tubes that each includes a longitudinal slot comprises a plurality duct-like channels. Each duct-like channel is configured to receive one of the furcation tubes in such a way that the respective furcation tube is insertable from a first side of the apparatus into the respective duct-like channel so that a long tube section of the respective furcation tube can be left protruding on the first side and a short tube section of the respective furcation tube can protrude on an opposite second side of the apparatus. Each duct-like channel is further configured so that when the respective furcation tube is inserted into the respective duct-like channel, a portion of the long tube section becomes spread apart along the longitudinal slot of the respective furcation tube in such a way that an optical fiber can be inserted into the short tube section of the respective furcation tube on the second side of the apparatus and protrude from the longitudinal slot in the long tube section on the first side of the apparatus.

An apparatus like the one mentioned above may be provided as a fan-out kit with the furcation tubes ready to be inserted into the apparatus, or as a fan-out assembly with the furcation tubes already inserted into the apparatus. For example, one embodiment of a fan-out assembly comprises a plurality of furcation tubes each having a longitudinal slot and an apparatus for inserting optical fibers into the furcation tubes. The apparatus includes a plurality duct-like channels into which the plurality of furcation tubes are inserted. Each duct-like channel receives one of the furcation tubes in such a way that a long tube section of the respective furcation tube protrudes on a first side of the apparatus and a short tube section of the respective furcation tube protrudes on an opposite second side of the apparatus. Additionally, a portion of the long tube section of each furcation tube is spread apart along the longitudinal slot so that an optical fiber can extend into the short tube section on the second side of the apparatus and protrude from the longitudinal slot in the long tube section on the first side of the apparatus.

An apparatus like the ones mentioned above serves as a tool that forces the optical fibers into the furcation tubes though the slots of the furcation tubes. The present disclosure provides a simple, convenient, and time-effective way for inserting optical fibers into furcation tubes. Gel residues on the optical fibers or dirty optical fibers are allowed for the installation process. Gel residues on the optical fibers or dirty fibers will not block the installation. Accordingly, no cleaning of the optical fibers is needed. No pushing of the optical fibers through the entire furcation tube is needed, and this reduces the risk of damaging or breaking the optical fibers. The apparatuses and methods disclosed may allow a safe, quick, and reliable insertion of the optical fibers into slotted furcation tubes. Exemplary optical fibers have diameters of 200 μm and 250 μm, and exemplary slotted furcation tubes have inner diameters of 400 μm±75 μm.

BRIEF DESCRIPTION OF THE DRAWINGS

Embodiments of the apparatus and method for inserting optical fibers into tubes are given in the dependent claims and the description below. Exemplary embodiments will be explained in more detail with reference to the drawings, in which:

DETAILED DESCRIPTION

The present disclosure relates to an apparatus for inserting optical fibers into tubes. The present disclosure relates further to an assembly comprising such an apparatus and to a method for inserting optical fibers into tubes using such an apparatus.

FIGS. 1 to 7 show details of a first embodiment of an apparatus 30 for inserting optical fibers into furcation tubes 31 and of an assembly 32 comprising such an apparatus 30 and furcation tubes 31.

The apparatus 30 allows the insertion of optical fibers into individual, longitudinally slotted furcation tubes 31.

The apparatus 30 according to the embodiment shown in FIGS. 1 to 7 comprises a first part 33 and a second part 34. The first part 33 and the second part 34 are in the embodiment of FIGS. 1 to 7 detachably mounted together, namely by a snap-fit connection of the first part 33 and the second part 34.

Figure 3:
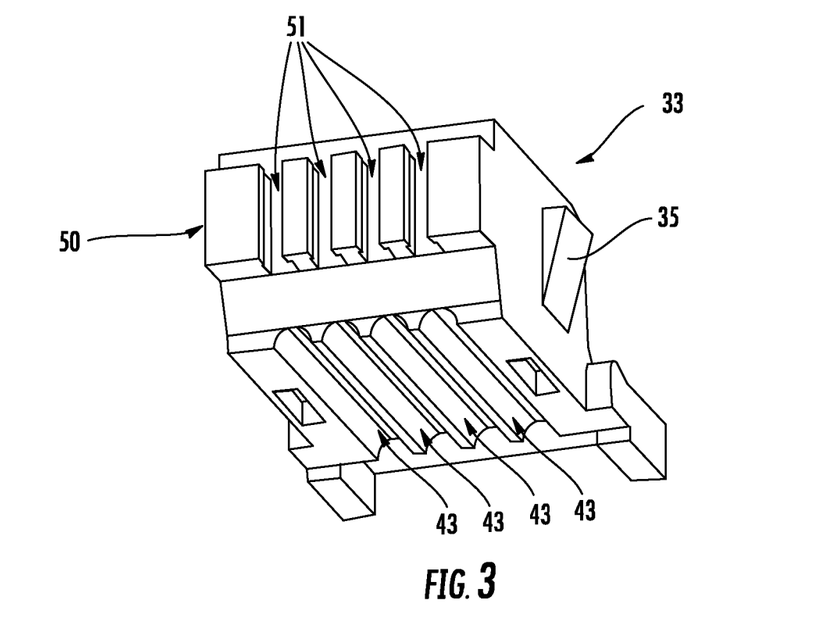
FIG. 3 is a perspective view of a first part of the apparatus of FIG. 1.
Figure 4:
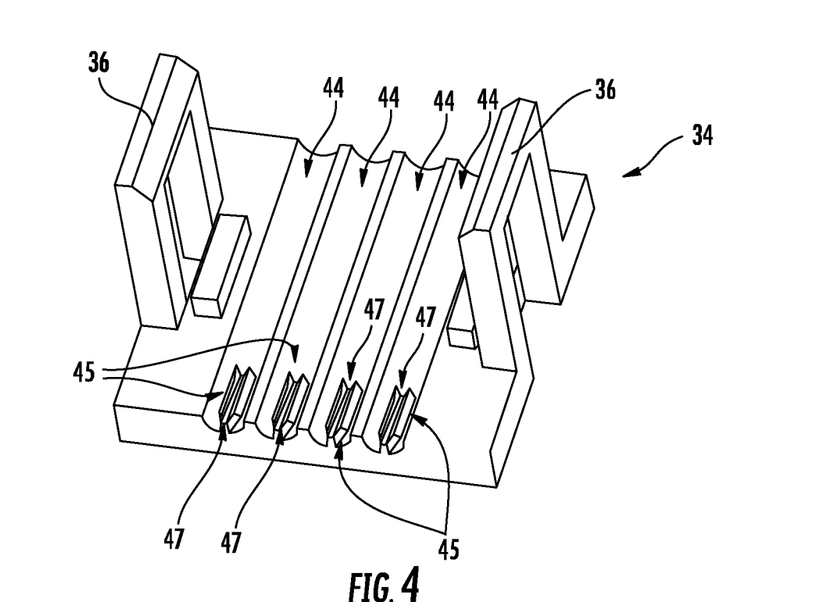
FIG. 4 is a perspective view of a second part of the apparatus of FIG. 1.
Figure 5:
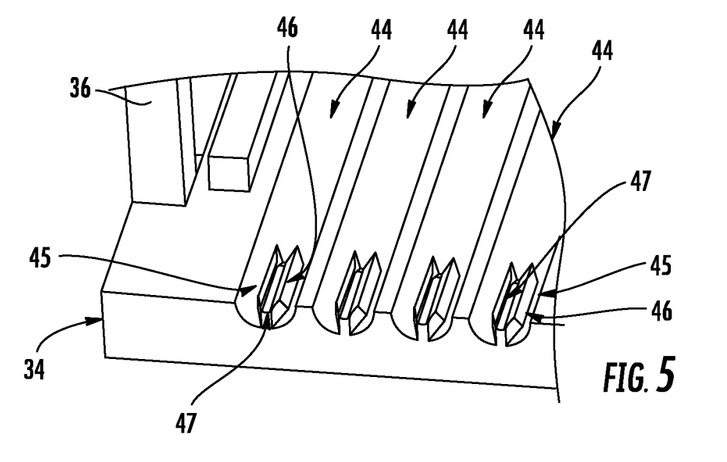
FIG. 5 shows a detail of the second part of FIG. 3.
Figure 6:
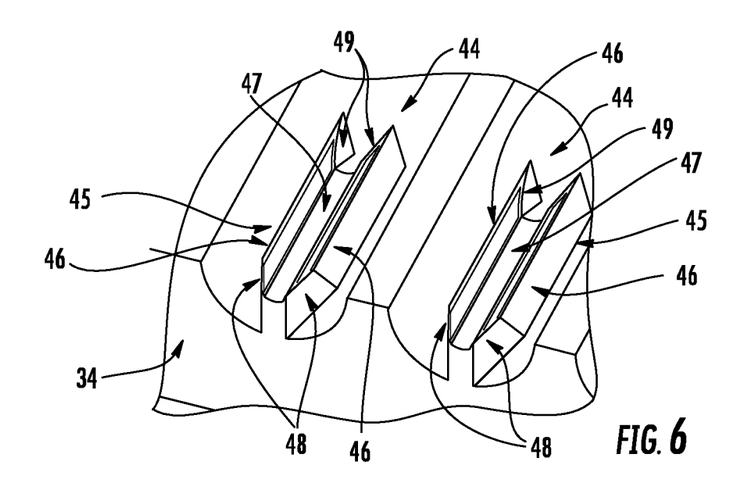
FIG. 6 shows a further detail of the second part of FIG. 3.
Figure 7:
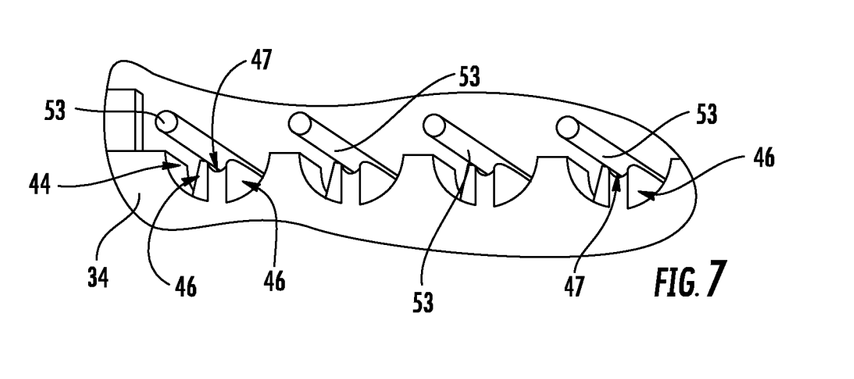
FIG. 7 shows a further detail of the second part of FIG. 3 together with optical fibers.
Figures 8, 9, 10:
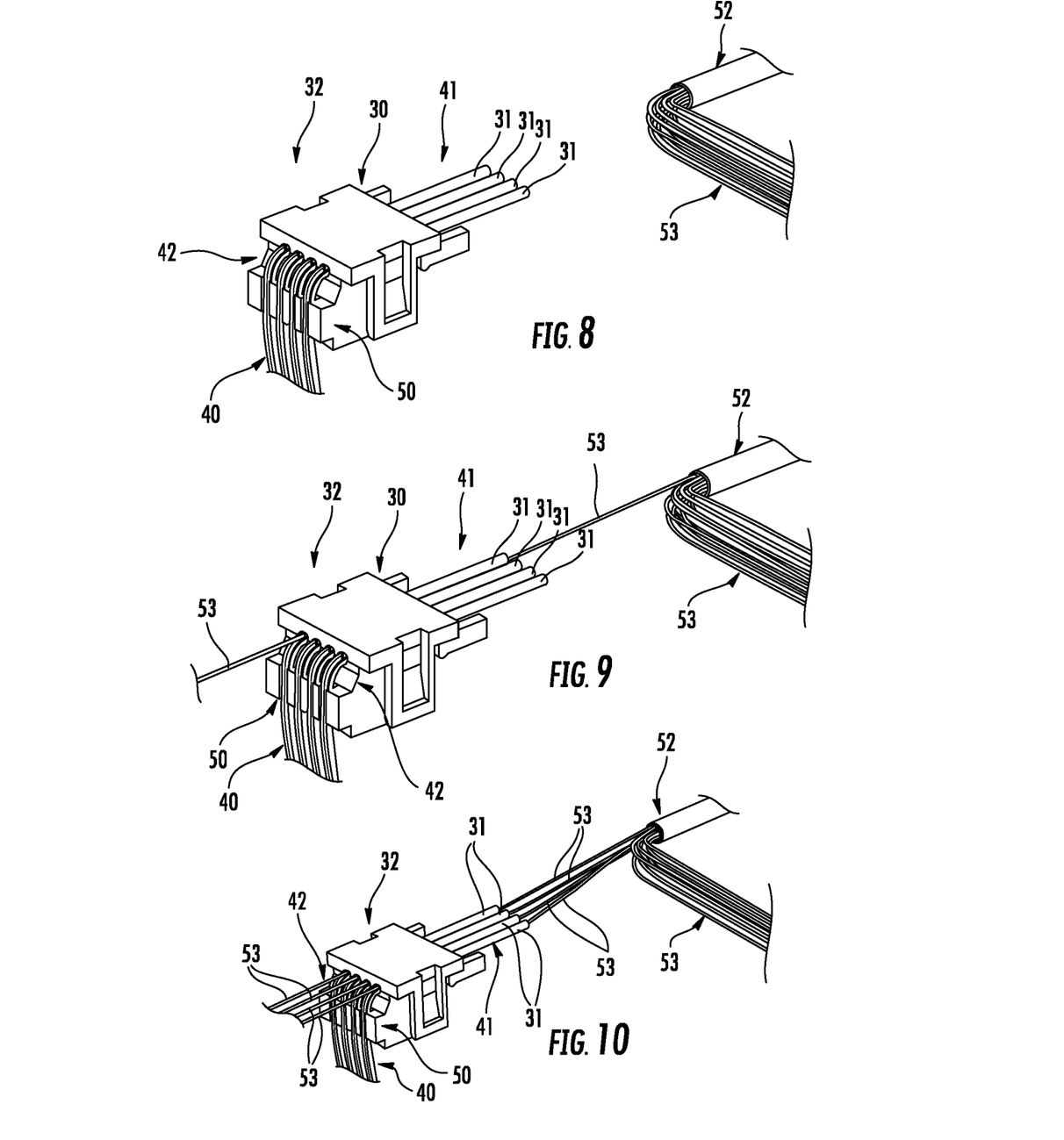
FIG. 8 shows the assembly of FIG. 1 together with optical fibers of a fiber bundle in a first installation status.
FIG. 9 shows the assembly and the optical fibers of the fiber bundle of FIG. 8 in a second installation status.
FIG. 10 shows the assembly and the optical fibers of the fiber bundle of FIGS. 8 and 9 in a third installation status.
Figure 11:
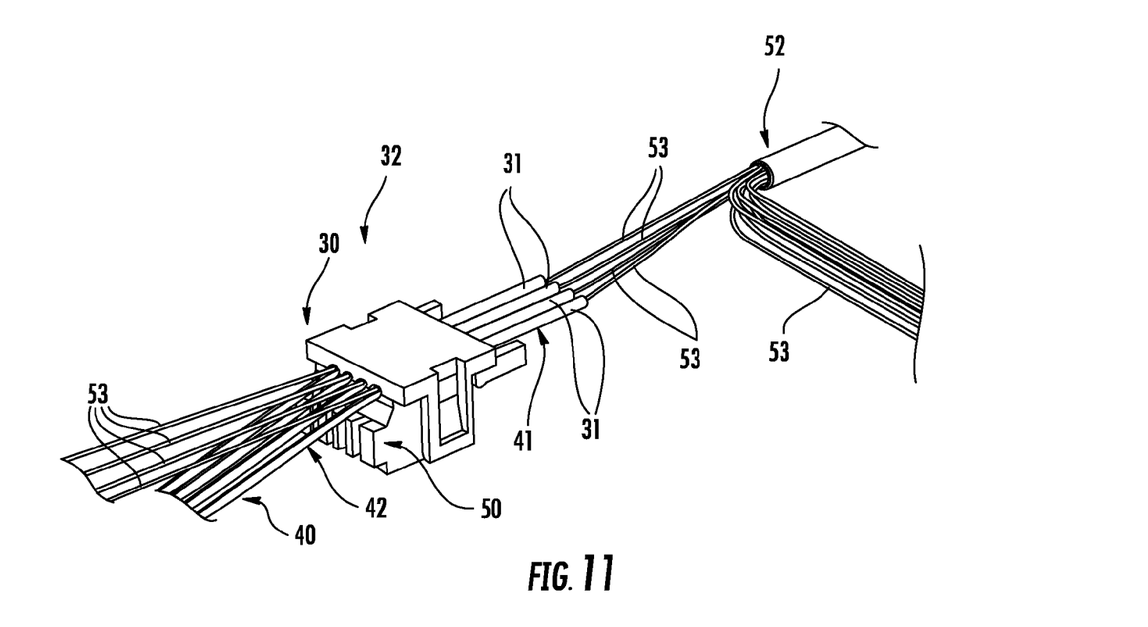
FIG. 11 shows the assembly and the optical fibers of the fiber bundle of FIGS. 8 to 10 in a fourth installation status.
Figure 12:
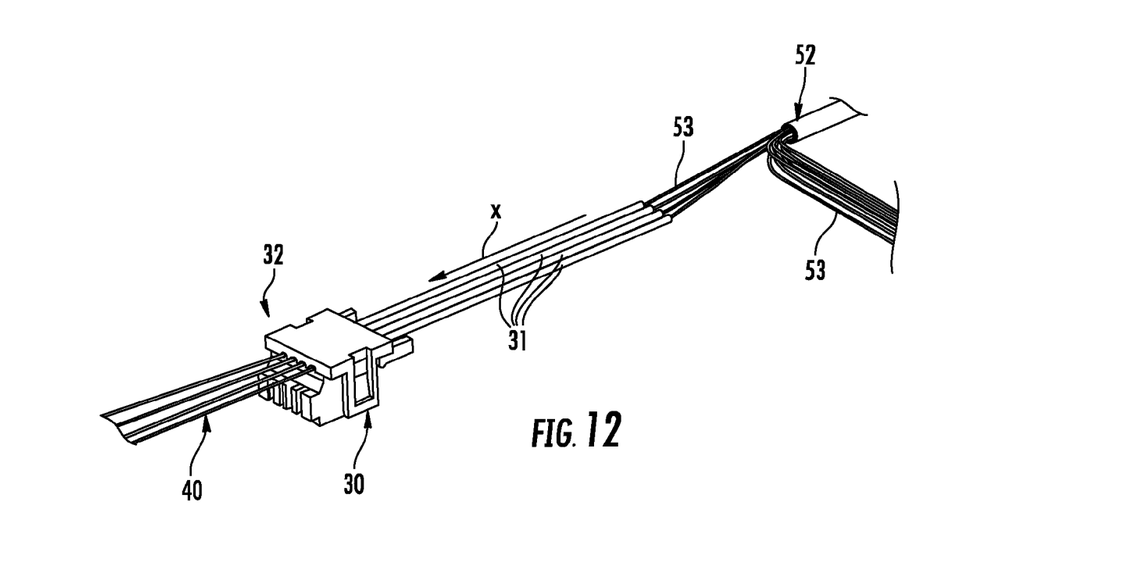
FIG. 12 shows the assembly and the optical fibers of the fiber bundle of FIGS. 8 to 11 in a fifth installation status.

The first part 33 of the apparatus 30 comprises first elements of said snap-fit connection, namely protrusions 35, and the second part of the apparatus comprises first elements of said snap-fit connection, namely snap elements 36.

The first part 33 and the second part 34 define together a plurality of duct-like channels 37 for the furcation tubes 31. Each duct-like channel 37 is configured to receive one slotted furcation tube 31. Each duct-like channel 37 receives the respective slotted furcation tube 31 in such a way that the respective furcation tube 31 is insertable from a first side 38 of the apparatus 30 into the respective duct-like channel 37.

The respective furcation tube 31 protrudes on the first side 38 and on an opposite second side 39 from the apparatus 30, namely with a relative long tube section 40 from the first side 38 of the apparatus 30 and with a relative short tube section 41 from the second side 39 of the apparatus 30.

Each duct-like channel 37 for the slotted furcation tubes 31 is further configured so that the respective slotted furcation tube 31 which is insertable into the respective duct-like channel 37 becomes spread apart in a tube portion 42 of the relative long tube section 40. As will be discussed in greater detail below, this is achieved by protrusions 45 in the embodiment of FIGS. 1 to 7.

The furcation tube 31 may be spread apart both within the respective duct-like channel 37 and on the second side 39 of the apparatus 30, especially when bending the relatively long tube section 40 relative to the apparatus 30, such that a portion 42 of the relatively long tube section 40 adjacent the respective duct-like channel 37 is spread apart.

The respective slotted furcation tube 31 becomes spread apart along a longitudinally slot/slit of furcation tube 31.

An optical fiber can then be inserted into the short tube section 41 of one of the furcation tubes 31, through the section of the respective furcation tube 31 held by the apparatus 30, and into the long tube section 40 of the respective furcation tube 31 before exiting the spread-apart portion 42 on the long tube section 40. In this manner, the respective optical fiber protrudes on the second side 39 and on the first side 38 of the apparatus 30 from the respective slotted furcation tube 31, namely at the second side 39 from the relative short tube section 41 through a free end of the respective furcation tube 31, and at the first side 38 from the spread-apart portion 42 of the long tube section 41 through the longitudinally slot of furcation tube 31.

The tube portion 42 of the relative long tube section 40 of the respective furcation tube 31 that is spread apart by the apparatus 30 has the purpose to open the slot in the respective furcation tube 31, so that the optical fiber can leave the respective furcation tube 31 at that point while inserting the same from the second side 39 of the apparatus 30.

Each duct-like channel 37 for the slotted furcation tubes 31 is further configured so that an optical fiber which protrudes at the first side 38 of the apparatus 30 from the spread apart tube portion 42 of the relative long tube section 40 becomes fully inserted in the relative long tube section 40 of the respective slotted furcation tube 31 when the apparatus 30 is moved along the furcation tubes 31 by pulling the apparatus 30 in the direction to free ends of the relative long tube sections 40 of the furcation tubes 31.

The first part 33 of the apparatus 30 provides first groove sections 43 (see FIG. 3) of the duct-like channels 37. The first groove sections 43 provided by the first part 33 of the apparatus 30 have a cross section like a circular arc.

The second part 34 of the apparatus 30 provides second groove sections 44 of the duct-like channels 37. The second groove sections 44 provided by the second part 34 of the apparatus 30 have a cross section like a circular arc which protrusions 45 for partially spreading apart the respective slotted furcation tube 31 and for guiding the respective optical fiber.

The first groove sections 43 and the second groove sections 44 provide together the duct-like channels 37 when the first part 33 of the apparatus 30 and the second part 34 of the apparatus 30 are mounted together.

Each protrusion 45 provided by the second groove sections 44 of the second part 34 of the apparatus 30 comprises outer surfaces 46 for partially spreading apart the respective slotted furcation tube 31.

Additionally, each protrusion 45 provided by the second groove sections 44 of the second part 34 of the apparatus 30 comprises an inner slot 47, wherein said inner slot 47 guides the respective optical fiber.

The outer surfaces 46 of each protrusion 45 provided by the second groove sections 44 of the second part 34 of the apparatus 30 comprise chamfers 48 (see FIG. 6) at ends of the same being directed to the first side 38 of the apparatus 40. These chamfers 38 facilitate inserting a slotted furcation tube into the respective duct-like channel 37 from the first side 38 of the apparatus 30.

The inner slot 47 of each protrusion 45 provided by the second groove sections 44 of the second part 34 of the apparatus 30 comprises additional chamfers 49 (see FIG. 6) at ends of the same being directed to the second side 39 of the apparatus 30. These chamfers 49 facilitate inserting an optical fiber into the respective furcation tube 31 from the second side 39 of the apparatus 30.

In the embodiment shown in FIGS. 1 to 7 the first part 33 of the apparatus 30 comprises further a holding section 50 for the relative long tube sections 40 of the furcation tubes 31 when the furcation tubes 31 are inserted into the duct-like channels 37 and when the optical fibers become inserted into the furcation tubes 31. Said holding section 50 is provided by parallel running slots 51 having an inner diameter being smaller than the outer diameter of the furcation tubes 31 so that the furcation tubes 31, namely the relative long tube sections 40 of the same which protrude from the first side 38 of the apparatus 30, can be hold or clamped in a form-fit manner.

The holding structure 50 and the first groove sections 43 both provided by the first part 33 of the apparatus 30 lie in planes crossing each other. These planes confine an angle between 30° and 90°, preferably between 45° and 90°. In the embodiment shown in FIGS. 1 to 7 these planes confine an angle of 90°.

In the embodiment shown in FIGS. 1 to 7 the relative long tube sections 40 of the furcation tubes 31 have to be bent by 90° in order to clamp them in the slots 51 of the holding section 50.

Figure 2:
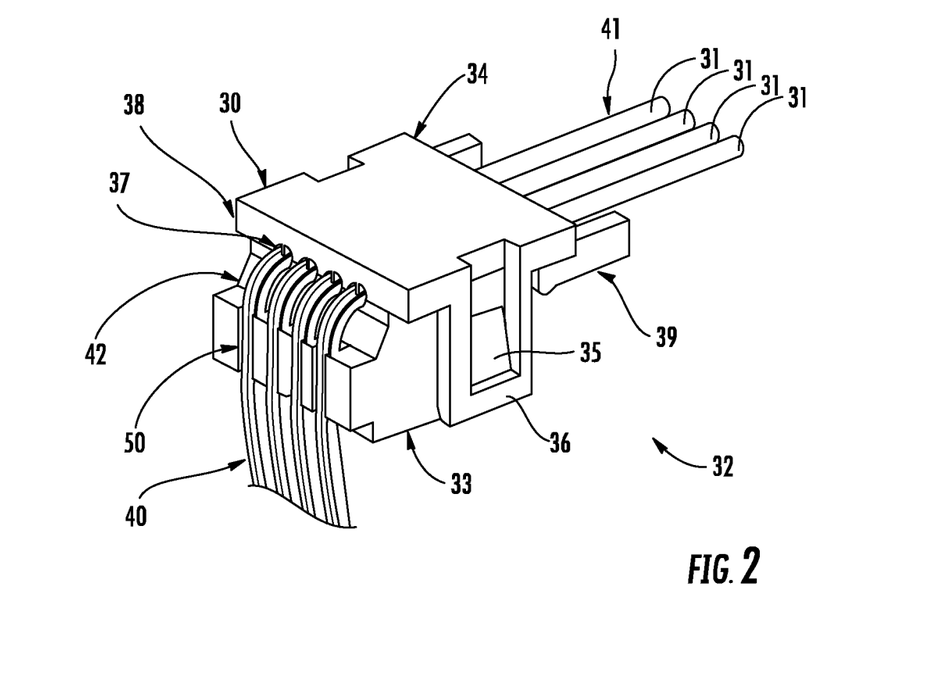
FIG. 2 is a perspective view of an assembly comprising the apparatus of FIG. 1 and slotted furcation tubes.

For the insertion of optical fibers into slotted furcation tubes 31, first an assembly 32 shown in FIG. 2 needs to be provided. Said assembly comprises the apparatus 30 and slotted furcation tubes 31 inserted into the duct-like channels 37 of the apparatus 30.

Figure 1:
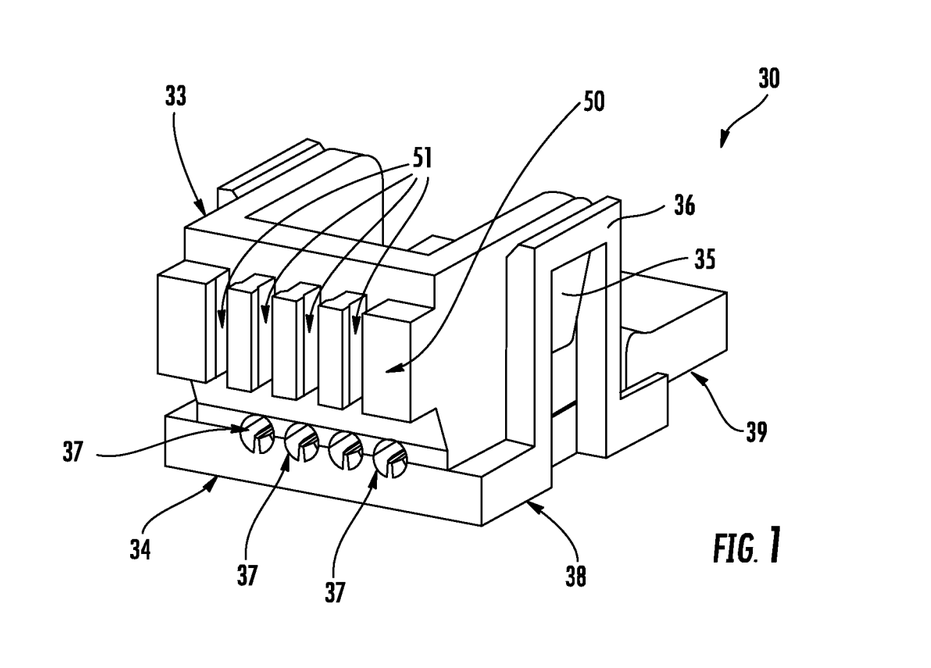
FIG. 1 is a perspective view of an embodiment of an apparatus for inserting optical fibers into an individual, longitudinally slotted furcation tubes.

In order to provide an assembly 32 shown in FIG. 2, the apparatus 30 shown in FIG. 1 and slotted furcation tubes 31 are provided. The slotted furcation tubes 31 become inserted into the duct-like channels 37 of the apparatus 30 from the first side 38 of the apparatus 30.

Prior to the insertion of the slotted furcation tubes 31 into the duct-like channels 37, the respective ends of the slotted furcation tubes 31 become enlarged by spreading apart said end, e.g. by using a mandrel.

The slotted furcation tubes 31 are then inserted into the duct-like channels 37 from the first side 38 of the apparatus 30, wherein the slotted furcation tube will slide into the duct-like channels 37 while pushing the respective furcation tubes 31. The chamfers 48 spread apart the slotted furcation tubes 31 when the same are pushed into the duct-like channels 37.

The slotted furcation tubes 31 are pushed in the duct-like channels 37 for a defined distance, so that the relative long tube section 40 protrudes from the first side 38 of the apparatus 30 and the relative short tube section 41 protrudes from the second side 39 of the apparatus 30.

The relative long tube section 40 protruding from the first side 38 of the apparatus 30 is then bent in the direction of the holding structure 50 to clamp them at the same.

The portion 42 of the respective furcation tube 31 that is spread apart and bent by the apparatus 30 has the purpose to open the slot in the respective furcation tube 31, so that the optical fiber can leave the respective furcation tube 31 at that point while inserting the same from the second side 39 of the apparatus 30.

The assembly 32 shown in FIG. 2 can in principle be provided in the installation field by the installer. In this case a fan-out kit is provided for the installer, the fan-out kit comprising a plurality of longitudinally slotted furcation tubes and an apparatus for inserting optical fibers into the plurality of furcation tubes.

However, in order to allow a most time effective installation, namely insertion of optical fibers into furcation tubes, the assembly 32 shown in FIG. 2 is factory assembled and become shipped as an assembled unit.

The insertion of optical fibers into the furcation tubes 31 of the assembly 32 is illustrated in FIGS. 8 to 12.

First (see FIG. 8), an assembly 32 comprising the apparatus 30 and the slotted furcation tubes 31 being inserted into the duct-like channels 37 of the apparatus 30 is provided. Also a fiber bundle 52 comprising several optical fibers 53 is provided.

Second (see FIG. 9), a first optical fiber 53 of the fiber bundle 52 becomes inserted in one of the furcation tubes 31 of the assembly 32. Said optical fiber becomes inserted from the second side 39 of the apparatus 30 into the respective furcation tube 31 so that the respective optical fiber 53 protrudes on the first side 38 of the apparatus 30 from the respective slotted furcation tube 31, namely at from the spread-apart portion 42 of the relative long tube section 40 which is bent to the holding structure 50. During the insertion of the optical fiber 53 in the respective furcation tube the fiber become pushed into the respective furcation tube 31 though free end of the relative short tube section 41, wherein the respective optical fiber 53 is guided by the chamfers 49 and by the slot 47 of the respective protrusion 45. The respective optical fiber 53 gets out of the respective furcation tube 31 at the first side 38 of the apparatus 30 and can be pulled up so that the optical fiber 53 runs is in a straight line. The spread-apart portion 42 on the relative long section 40 of the respective furcation tube 31 has the purpose to open the slot in the respective furcation tube 31, so that the optical fiber 31 can leave the respective furcation tube 31 at that point while inserting the same from the second side 39 of the apparatus 30, namely though free end of the relative short tube section 41.

Third (see FIG. 10), the above second step is repeated until an individual optical fiber is inserted into each of the furcation tubes 31 of the assembly 32.

Fourth (see FIG. 11), the relative long tube section 40 of the furcation tubes 31 protruding from the first side 38 of the apparatus 30 become released from the holding structure 50. The furcation tubes 31 are then in a loose order.

Fifth (see FIG. 12), the apparatus 30 becomes moved along the furcation tubes 31 by pulling the same in the direction X to free ends of the relative long tube sections 40 of the furcation tubes 31. The optical fibers 53 become automatically inserted into the furcation tubes 31. Before moving the apparatus 30 in the direction X to free ends of the relative long tube sections 40 of the furcation tubes 31 the opposite, relative short sections 41 of the furcation tubes 31 become fixed. When the relative short sections 41 of the furcation tubes 31 are fixed, the apparatus 30 can be pulled until the furcation tubes 31 are surrounding the optical fibers 53 over the whole length of the furcation tubes 31.

The apparatus 30 can then be recycled either in the field or in the factory by placing new furcation tubes 31 into the duct-like channels 37 of the apparatus 30.

FIGS. 13 to 18 show details of a second embodiment of an apparatus 30 for inserting optical fibers into furcation tubes 31 and of an assembly 32 comprising such an apparatus 30 and furcation tubes 31. In order to avoid unnecessary repetitions, identical reference signs are used for similar parts.

Below, on such details will be described for the embodiment of FIGS. 13 to 18 in which the same differs from the embodiment of FIGS. 1 to 7. Regarding all other details reference is made to the above description of FIGS. 1 to 12.

In the embodiment of FIGS. 13 to 18, the first part 33 and the second part 34 of the apparatus 30 which provide together the duct-like channels 37 for the slotted furcation tubes 31 are fixedly mounted together, namely by a glue connection. Glue becomes placed on at least one surface 54 and/or 55 of the first part 33 and/or the second part 34 of the apparatus 30 and the same become pressed together.

In the embodiment of FIGS. 13 to 18, the first part 33 and the second part 34 provide a larger number of duct-like channels 37 so that the apparatus can receive a larger number of slotted furcation tubes 31.

In the embodiment of FIGS. 13 to 18, the planes in which on the one hand the duct-like channels 37 are positioned and in which on the other hand the slots 51 of the holding structure 50 are positioned, confine an angle of 60°. Further on, the relative long tube sections 40 protruding from the first side 38 of the apparatus 30 lie loosely in the slots 50 are not clamped in the same.

In the embodiment of FIGS. 13 to 18, the assembly 33 comprises in addition apparatus 30 and furcation tubes 31 a funnel housing 56. The funnel housing 56 acts together with the furcation tubes 31, namely with the relative short tube sections 41 of the furcation tubes 31 protruding from the second side 39 of the apparatus 30. The funnel housing 56 comprises guiding slots 57 receiving the relative short tube sections 41 of the slotted furcation tubes 31 protruding from the second side 39 of the apparatus 30. The funnel housing 56 further provides a stop element 58 for each guiding slot 57 limiting the insertion depth of the furcation tubes 31 into the funnel housing 56. Said stop elements 58 are provided by tube-like elements being open at a side facing towards to the ends of the short tube sections 41 of the slotted furcation tubes 31 and at a side facing away from the ends of the short tube sections 41 of the slotted furcation tubes 31, so that optical fibers 53 can be fed through the same into the respective furcation tube.

Figure 16:
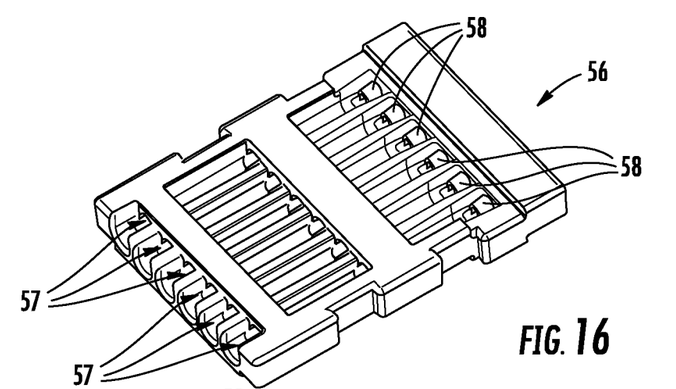
FIG. 16 is a perspective view of a funnel housing of the apparatus of FIG. 13.
Figure 17:
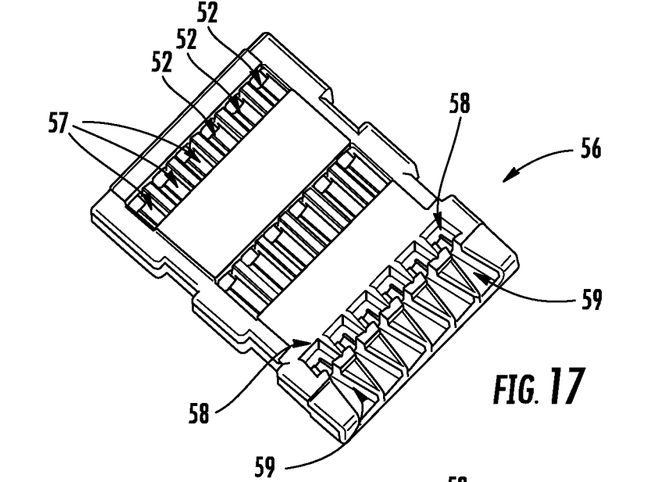
FIG. 17 is another perspective view of the funnel housing of FIG. 16.
Figure 18:
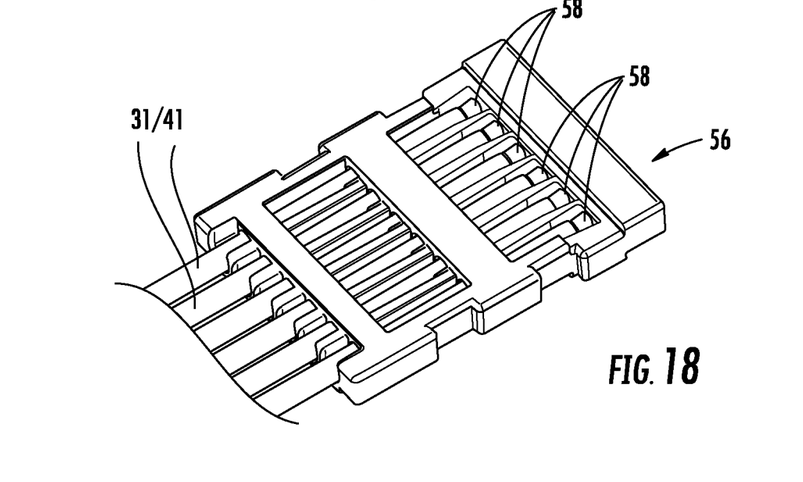
FIG. 18 shows the funnel housing of FIG. 16 together with furcation tubes.

Said stop elements 58 provided by said tube-like elements merge at the side facing away from the ends of the short tube sections 41 of the slotted furcation tubes 31 into funnel structures 59 allowing a secure and easy insertion of the optical fibers into to furcation tubes 31.

The relative short tube sections 41 of the slotted furcation tubes 31 protruding from the second side 39 of the apparatus 30 into the funnel housing 56 are preferably fixed to the funnel housing 56 by a glue connection. The funnel housing 56 is one option to fix the relative short sections 41 of the furcation tubes 31 before the apparatus 30 becomes moved along the furcation tubes 31 by pulling the same in the direction X to free ends of the relative long tube sections 40 of the furcation tubes 31.

Figure 13:
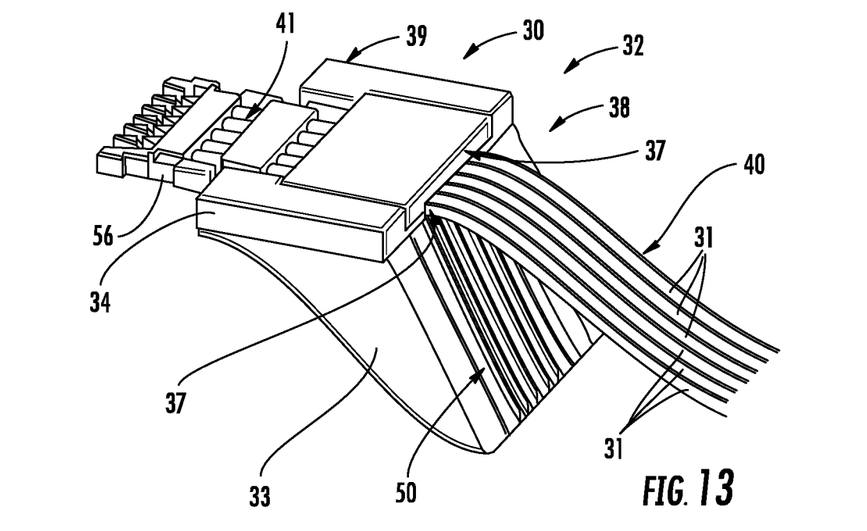
FIG. 13 is a perspective view of an embodiment of an apparatus for inserting optical fibers into an individual, longitudinally slotted furcation tubes together with the furcation tubes.
Figure 14:
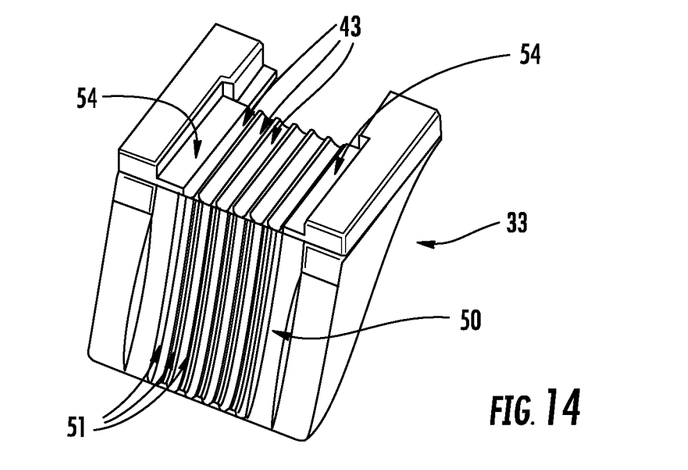
FIG. 14 is a perspective view of a first part of the apparatus of FIG. 13.
Figure 15:
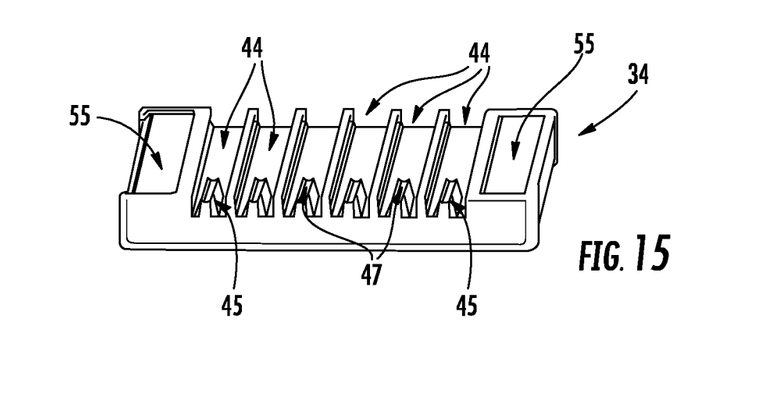
FIG. 15 is a perspective view of a second part of the apparatus of FIG. 13.
Figure 19:
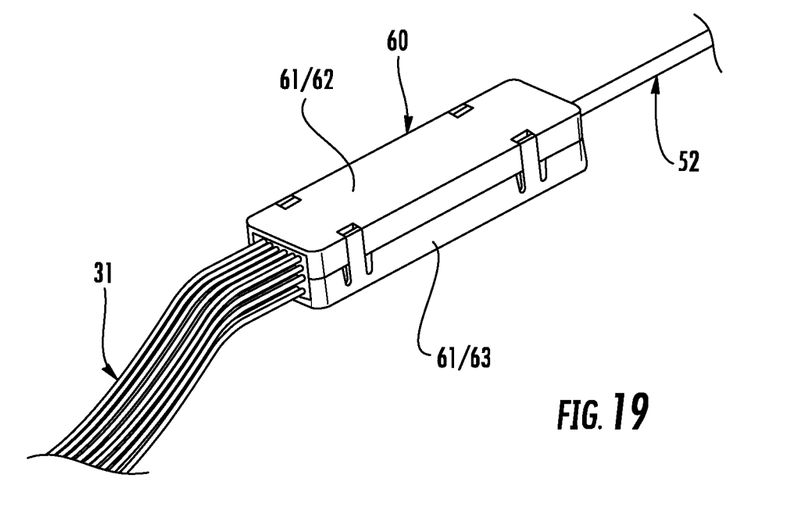
FIG. 19 shows a fiber buffer tube fan-out adapter provided by the apparatus, assembly and method according to the present invention together with a housing protecting the same.
Figure 20:
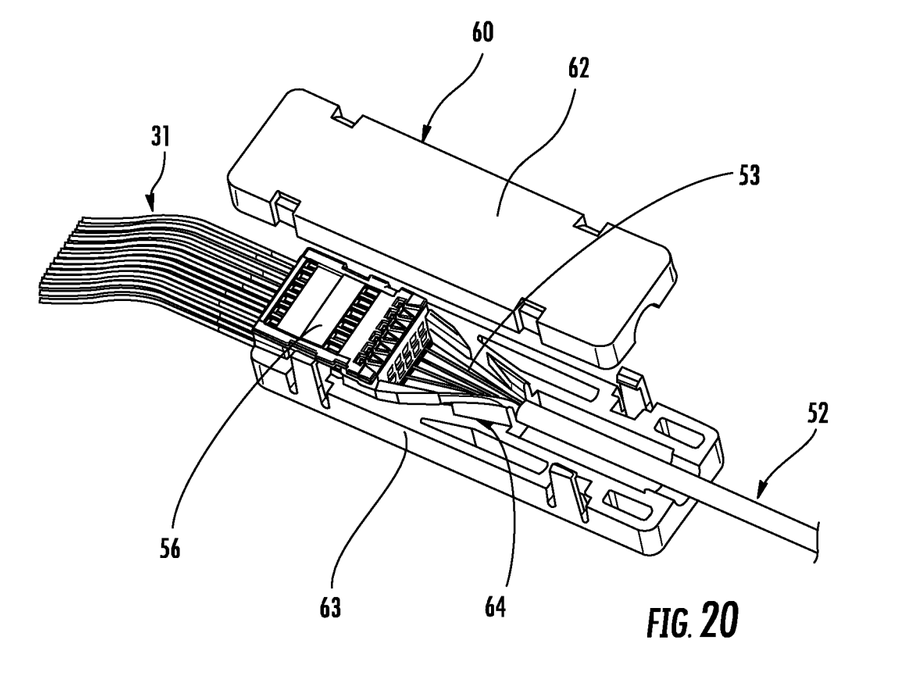
FIG. 20 shows the fiber buffer tube fan-out adapter of FIG. 20 with the housing being opened.

FIGS. 19 and 20 show a fiber buffer tube fan-out adapter 60 provided under use of the assembly 32 of the embodiment according to FIGS. 13 to 18. The adapter 60 comprises an adapter housing 61 with an upper housing part 62 and a lower housing part 63. The adapter housing 61 defines an interior space 64. The interior space 64 accommodates four stacked funnel housings 56 each receiving six furcation tubes 31 each surrounding one optical fiber 53, so that a 24-fiber buffer tube fan-out adapter 60 is provided. Four assemblies shown in FIG. 13 are needed to provide the fiber buffer tube fan-out adapter 60 shown in FIGS. 19 and 20.

In the embodiments shown the apparatus 30 comprises the first part 33 and the second part 34 which are mounted together and which define together the plurality duct-like channels 37. Is should be noted that the first part 33 and the second part 34 can be provided as one monolithic unit. In this case the apparatus 30 comprises only part providing the duct-like channels 37.

What is claimed is:

1. An apparatus for inserting optical fibers into furcation tubes that each include a longitudinal slot, comprising:
   a plurality duct-like channels;
   wherein each duct-like channel is configured to receive one of the furcation tubes in such a way that the respective furcation tube is insertable from a first side of the apparatus into the respective duct-like channel so that a long tube section of the respective furcation tube can be left protruding on the first side and a short tube section of the respective furcation tube can protrude on an opposite second side of the apparatus;
   wherein each duct-like channel is further configured so that when the respective furcation tube is inserted into the respective duct-like channel, a portion of the long tube section becomes spread apart along the longitudinal slot so that an optical fiber can extend into the short tube section on the second side of the apparatus and protrude from the longitudinal slot in the long tube section on the first side of the apparatus.

2. The apparatus of claim 1, wherein each duct-like channel comprises a protrusion for partially spreading apart the respective furcation tube and for guiding the respective optical fiber.

3. The apparatus of claim 2, wherein each protrusion comprises outer surfaces for partially spreading apart the respective furcation tube, and that each protrusion further comprises an inner slot for guiding the respective optical fiber.

4. The apparatus of claim 3, wherein the outer surfaces of each protrusion comprise chamfers at ends of the outer surfaces being directed to the first side of the apparatus.

5. The apparatus of claim 3, wherein the inner slot of each protrusion comprises chamfers at ends of the inner slot being directed to the second side of the apparatus.

6. The apparatus of claim 1, wherein the apparatus comprises a first part and a second part mounted together, and wherein the first part and the second part define together the plurality duct-like channels.

7. The apparatus of claim 6, wherein the first part provides first groove sections of the duct-like channels and the second part provides second groove sections of the duct-like channels, wherein the first groove sections and the second groove sections provide together the duct-like channels when the first part and a second part are mounted together, wherein the first groove sections provided by the first part each have a semi-circular cross section, and wherein the second groove sections provided by the second part each have a semi-circular cross section, and wherein either or both the first and second groove sections include a protrusion for partially spreading apart the respective furcation tube and for guiding the respective optical fiber.

8. The apparatus of claim 6, wherein the first part and a second part are detachably mounted together.

9. The apparatus of claim 6, wherein the first part and a second part are fixedly mounted together.

10. The apparatus of claim 1, further comprising a holding section for holding the long tube sections of the furcation tubes when the furcation tubes are inserted into the duct-like channels and when the optical fibers become inserted into the furcation tubes.

11. A fan-out kit for optical fibers, comprising
a plurality of furcation tubes each having a longitudinal slot; and
an apparatus for inserting the optical fibers into the furcation tubes, the assembly including a plurality duct-like channels into which the plurality of furcation tubes can be inserted;
wherein each duct-like channel is configured to receive one of the furcation tubes in such a way that the respective furcation tube is insertable from a first side of the apparatus into the respective duct-like channel so that a long tube section of the respective furcation tube can be left protruding on the first side and a short tube section of the respective furcation tube can protrude on an opposite second side of the apparatus; and
wherein each duct-like channel is further configured so that when the respective furcation tube is inserted into the respective duct-like channel, a portion of the long tube section becomes spread apart along the longitudinal slot so that an optical fiber can extend into the short tube section on the second side of the apparatus and protrude from the longitudinal slot in the long tube section on the first side of the apparatus.

12. A fan-out assembly for optical fibers, comprising:
a plurality of furcation tubes each having a longitudinal slot; and
an apparatus for inserting the optical fibers into the furcation tubes, the apparatus including a plurality duct-like channels into which the plurality of furcation tubes are inserted;
wherein each duct-like channel receives one of the furcation tubes in such a way that a long tube section of the respective furcation tube protrudes on a first side of the apparatus and a short tube section of the respective furcation tube protrudes on an opposite second side of the apparatus; and
wherein a portion of the long tube section of each furcation tube is spread apart along the longitudinal slot so that an optical fiber can extend into the short tube section on the second side of the apparatus and protrude from the longitudinal slot in the long tube section on the first side of the apparatus.

13. The fan-out assembly of claim 12, wherein each duct-like channel is configured so that when the respective furcation tube is further inserted into the respective duct-like channel, a further portion of the long tube section becomes spread apart along the longitudinal slot to accommodate the respective optical fiber.

14. The fan-out assembly of claim 12, wherein the apparatus includes a funnel housing receiving the short tube sections of the furcation tubes protruding from the second side of the apparatus.

15. The fan-out assembly of claim 13, wherein the funnel housing and the furcation tubes are fixedly mounted together.

16. A method for inserting at least one optical fiber into at least one furcation tube by using an apparatus that includes at least one duct-like channel into which the at least one furcation tube is inserted, wherein a long tube section of the at least one furcation tube protrudes on a first side of the apparatus and a short tube section of the at least one furcation tube protrudes on an opposite second side of the apparatus, the method comprising:
inserting an optical fiber into the short tube section of the at least one furcation tube and extending the optical fiber through the at least one furcation tube in such a way that an end section of the optical fiber protrudes from a slot in the long tube section, wherein the slot extends to a free end of the long tube section;
moving the apparatus relative to the at least one furcation tube along a longitudinal direction of the at least one furcation tube, over the long tube section, and toward the free end of the long tube section to move the end section of the optical fiber through the slot in the long tube section so that the optical fiber becomes inserted into the furcation tube.

17. The method of claim 16, wherein the assembly includes a plurality of the duct-like channels and a plurality of the furcation tubes each inserted into a respective one of the duct-like channels, wherein inserting an optical fiber comprises inserting a plurality of optical fibers into respective short tube sections of the plurality of furcation tubes, and wherein the apparatus is moved relative to the plurality of furcation tubes to insert the plurality of optical fibers into the plurality of furcation tubes.

* * * * *